United States Patent
Mann

(10) Patent No.: US 8,788,785 B1
(45) Date of Patent: Jul. 22, 2014

(54) SYSTEMS AND METHODS FOR PREVENTING HEAP-SPRAY ATTACKS

(75) Inventor: Uri Mann, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 454 days.

(21) Appl. No.: 13/006,705

(22) Filed: Jan. 14, 2011

(51) Int. Cl.
*G06F 12/00* (2006.01)

(52) U.S. Cl.
USPC .................................. 711/172; 711/E12.091

(58) Field of Classification Search
USPC .......................................................... 711/172
See application file for complete search history.

(56) References Cited

U.S. PATENT DOCUMENTS

| | | | |
|---|---|---|---|
| 6,381,735 B1* | 4/2002 | Hunt | 717/158 |
| 8,224,934 B1* | 7/2012 | Dongre et al. | 709/221 |
| 2002/0072830 A1* | 6/2002 | Hunt | 701/1 |
| 2008/0109213 A1* | 5/2008 | Kaplan | 704/9 |
| 2009/0300764 A1* | 12/2009 | Freeman | 726/24 |
| 2010/0082926 A1* | 4/2010 | Sahita et al. | 711/163 |
| 2010/0205674 A1* | 8/2010 | Zorn et al. | 726/25 |
| 2012/0216285 A1* | 8/2012 | Walsh | 726/26 |

OTHER PUBLICATIONS

Ratanaworabhan. Nozzle: A Defense Against Heap-spraying Code Injection Attacks. Technical Report MSR-TR-2008-176. Micorsoft Research, Nov. 2008.*
Egle. Defending Browsers againts Drive-by Downloads: Mitigating Heap-Spraying Code Injection Attacks. DIMVA 2009, LNCS 5587, pp. 88-106, 2009. Springer-Verlag Berlin Heidelberg 2009.*

* cited by examiner

*Primary Examiner* — Sean D Rossiter
(74) *Attorney, Agent, or Firm* — ALG Intellectual Property, LLC

(57) ABSTRACT

A computer-implemented method for preventing heap-spray attacks may include identifying an object-oriented program. The computer-implemented method may also include identifying, within the object-oriented program, a request to allocate memory for a polymorphic object. The polymorphic object may include a pointer to a virtual method table that supports dynamic dispatch for at least one method of the polymorphic object. The computer-implemented method may further include identifying an area of memory reserved for polymorphic objects. The computer-implemented method may additionally include allocating memory for the polymorphic object from the reserved area of memory. Various other methods, systems, and computer-readable media are also disclosed.

20 Claims, 8 Drawing Sheets

SYSTEMS AND METHODS FOR PREVENTING HEAP-SPRAY ATTACKS

BACKGROUND

Object-oriented programming languages may support subtype polymorphism, allowing the reuse of constructs already defined in a data type within a subtype dependent on the data type. For example, a data type (e.g., a class according to which objects may be created) may define a virtual method that is inheritable by a subtype of the data type, but which may also be implemented differently by the subtype. However an object-oriented program may implement dynamic dispatch, determining which implementation of a method to invoke at runtime. Dynamic dispatching may be implemented by embedding a pointer within an object to a table of method addresses (a "virtual method table").

Unfortunately, some malicious programmers may attempt to exploit the functionality enabled by dynamic dispatch of methods using a heap-spray attack. For example, an object may include a virtual method table that defines memory addresses of a member method. By overwriting the pointer within the object to the virtual method table with values that point to an area of the heap written to (i.e., "sprayed") by an attacker, the attacker may hijack execution of a program to run shellcode.

In other cases, a design error of a program may lead to an object pointer being used after the object was deallocated. If the memory area previously containing the object is reallocated and sprayed by an attacker, the attacker may control the value of the pointer to the virtual method table and may point it to the malicious shellcode.

In one traditional attempt to prevent heap-spray attacks, memory within predetermined address ranges that are recognized as susceptible to heap-spray attacks may be marked as unusable. Unfortunately, this approach may be research-intensive, potentially leaving unnoticed exploitable address ranges and requiring reevaluation for different memory addressing schemes and/or instruction sets. Furthermore, memory marked as unusable may be wasted. Accordingly, the instant disclosure identifies a need for additional and improved methods for preventing heap-spray attacks.

SUMMARY

As will be described in greater detail below, the instant disclosure generally relates to systems and methods for preventing heap-spray attacks. Systems and methods described herein may prevent heap-spray attacks by allocating memory for polymorphic objects in a region of memory separate from a general heap used for allocating memory for other data types. For example, a method may include 1) identifying an object-oriented program, 2) identifying, within the object-oriented program, a request to allocate memory for a polymorphic object, the polymorphic object including a pointer to a virtual method table that supports dynamic dispatch for at least one method of the polymorphic object, 3) identifying an area of memory reserved for polymorphic objects, and 4) allocating memory for the polymorphic object from the reserved area of memory.

The systems described herein may identify the object-oriented program in a variety of contexts. For example, the object-oriented program may include an executable file. In this example, the request to allocate memory may include one or more instructions within the executable file. In another example, the object-oriented program may include a process. In this example, the request may include one or more instructions within the process. In an additional example, the object-oriented program may include a source-code file. In this example, the request may include a portion of the source code file.

Identifying the request to allocate memory may involve any of a variety of steps. In some examples, the systems described herein may insert a hook into a memory allocation routine of the object-oriented program (e.g., to check whether the request to allocate memory is for a polymorphic object). Additionally or alternatively, the systems described herein may analyze the request to determine whether the request is directed to allocating memory for the polymorphic object.

Identifying the area of memory reserved for polymorphic objects may include reserving the area of memory (e.g., from a dynamic allocation memory pool of the process). In some examples, the area of memory may be reserved exclusively for polymorphic objects. Additionally or alternatively, the area of memory may be separate from a default heap used for memory allocations for non-object data types.

The systems described herein may allocate memory for the polymorphic object in a variety of contexts (e.g., compiling a source-code file to allocate from the reserved area of memory, modifying an executable file to allocate from the reserved area of memory, intercepting a memory allocation attempt in a running process, etc.). In some examples, allocating memory for the polymorphic object may include generating one or more instructions to allocate memory for the polymorphic object from the reserved area of memory.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
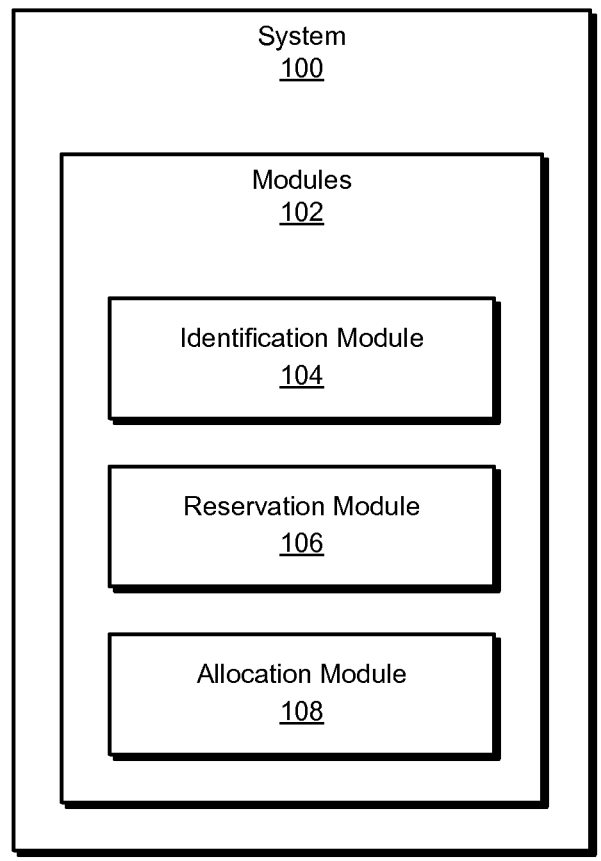
FIG. 1 is a block diagram of an exemplary system for preventing heap-spray attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for preventing heap-spray attacks. Systems and methods described herein may prevent heap-spray attacks by allocating memory for polymorphic objects in a region of memory separate from a general heap used for allocating memory for other data types. By using a separate region of memory for polymorphic objects, these systems and methods may prevent a would-be attacker from overwriting virtual method pointers within polymorphic objects using other data types (e.g., taking advantage of programmatic errors which overflow other data types and/or errors allowing the reuse of discarded polymorphic objects) potentially making heap-spray attacks significantly more difficult to execute.

Figure 2:
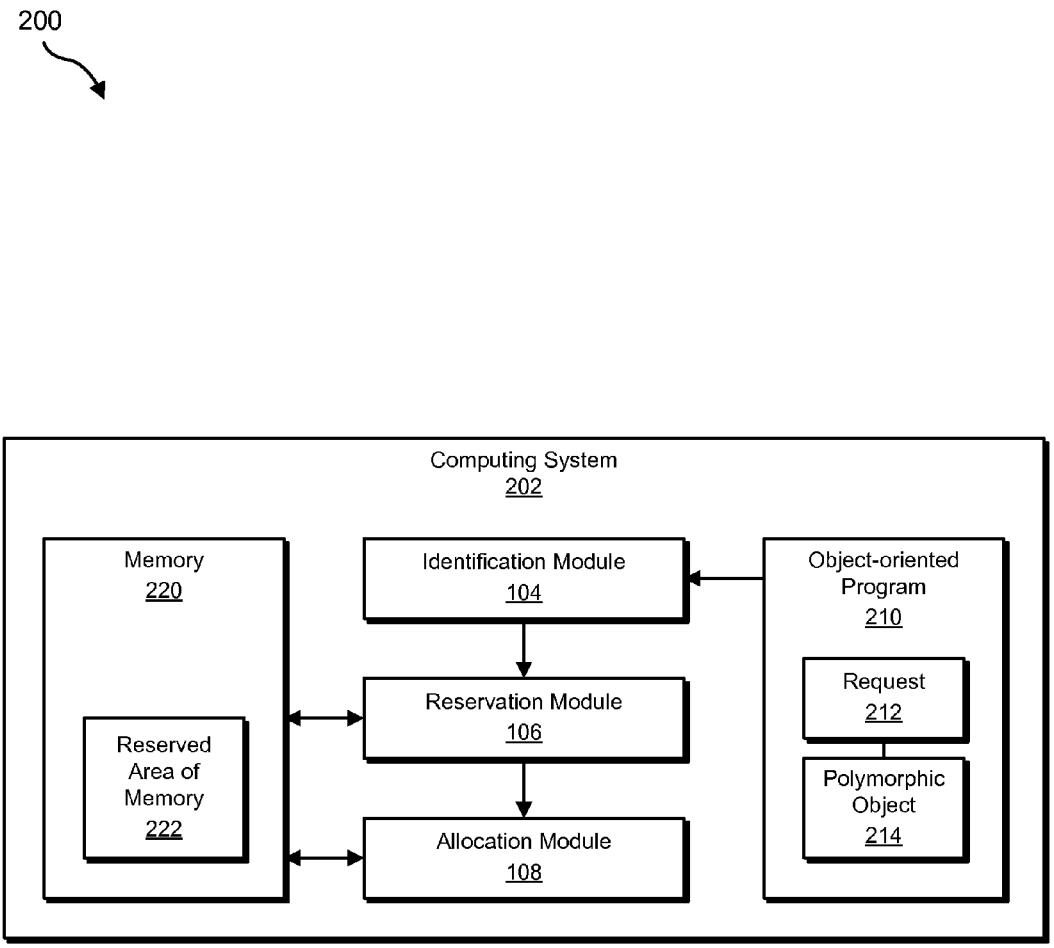
FIG. 2 is a block diagram of another exemplary system for preventing heap-spray attacks.
Figure 4:
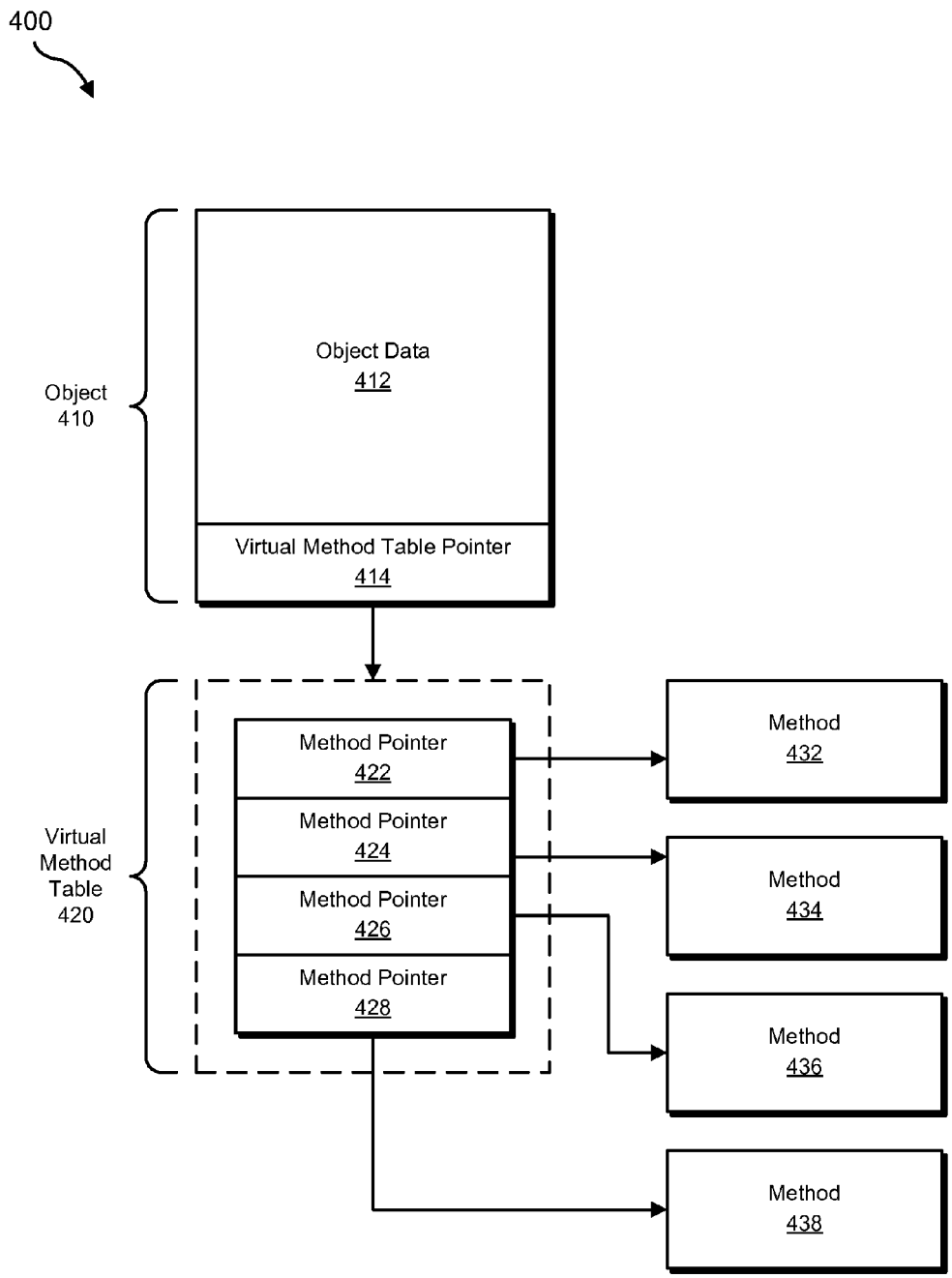
FIG. 4 is a diagram of an exemplary polymorphic object structure.
Figure 5:
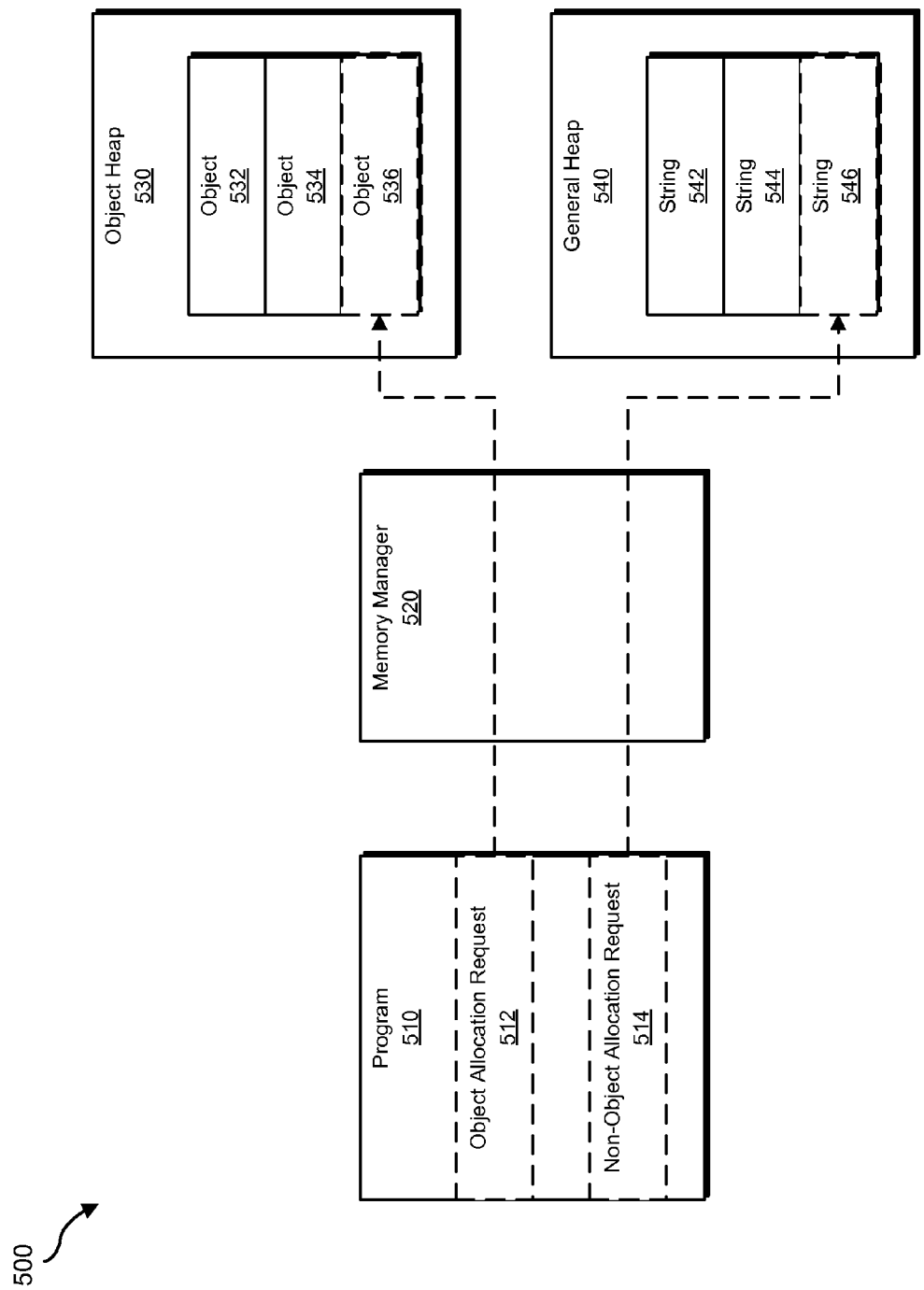
FIG. 5 is a block diagram of an exemplary system for preventing heap-spray attacks.

The following will provide, with reference to FIGS. 1, 2, and 5, detailed descriptions of exemplary systems for preventing heap-spray attacks. Detailed descriptions of corresponding computer-implemented methods will also be provided in connection with FIG. 3. Detailed descriptions of an exemplary polymorphic object structure and an exemplary heap-spray attack will be provided in connection with FIGS. 4 and 6, respectively. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for preventing heap-spray attacks. As illustrated in this figure, exemplary system 100 may include one or more modules 102 for performing one or more tasks. For example, and as will be explained in greater detail below, exemplary system 100 may include an identification module 104 programmed to identify an object-oriented program. Identification module 104 may also be programmed to identify, within the object-oriented program, a request to allocate memory for a polymorphic object, the polymorphic object including a pointer to a virtual method table that supports dynamic dispatch for at least one method of the polymorphic object. Exemplary system 100 may also include a reservation module 106 programmed to identify an area of memory reserved for polymorphic objects.

In addition, and as will be described in greater detail below, exemplary system 100 may include an allocation module 108 programmed to allocate memory for the polymorphic object from the reserved area of memory. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 illustrated in FIG. 2, computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 with an object-oriented program 210 that is potentially susceptible to heap-spray attacks. In one embodiment, and as will be described in greater detail below, Computing system 202 may include identification module 104, reservation module 106, and allocation module 108.

Identification module 104 may be programmed to identify object-oriented program 210. Identification module 104 may also be programmed to identify, within object-oriented program 210, a request 212 to allocate memory for a polymorphic object 214. Polymorphic object 214 may include a pointer to a virtual method table that supports dynamic dispatch for at least one method of the polymorphic object. Reservation module 106 may be programmed to identify a reserved area of memory 222 (e.g., within memory 220) reserved for polymorphic objects. Allocation module 108 may be programmed to allocate memory for polymorphic object 214 from reserved area of memory 222.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Figure 3:
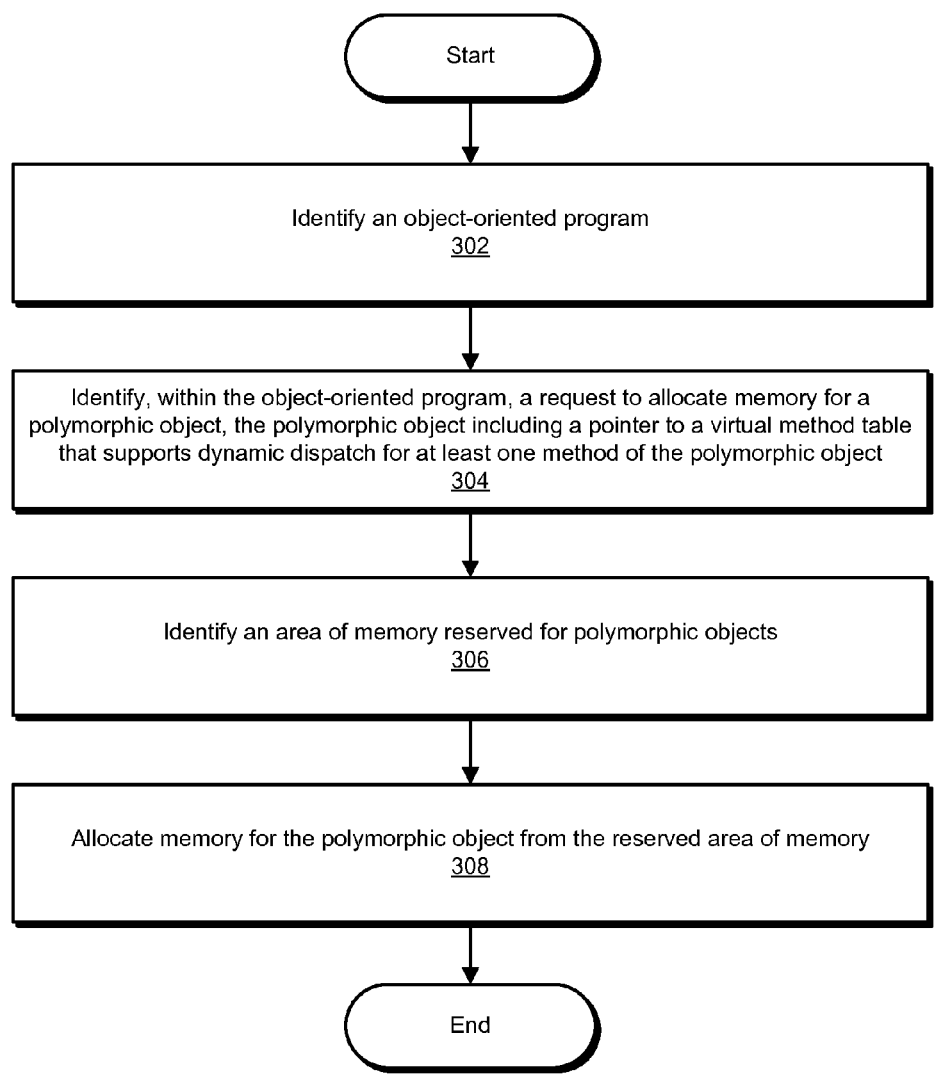
FIG. 3 is a flow diagram of an exemplary method for preventing heap-spray attacks.

FIG. 3 is a flow diagram of an exemplary computer-implemented method 300 for preventing heap-spray attacks. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an object-oriented program. For example, at step 302 identification module 104 may, as part of computing system 202, identify object-oriented program 210.

As used herein, the term "object-oriented program" may refer to any program (e.g., executable file, process, and/or source-code file) that supports polymorphism, dynamic dispatch, and/or may otherwise be vulnerable to heap-spray attacks through overwriting a virtual method pointer and/or a pointer to a virtual method table.

Identification module 104 may perform step 302 in a variety of contexts. For example, the object-oriented program may include an executable file. As used herein, the phrase "executable file" may refer to any file including computer-executable instructions, including a stand-alone executable file, an object file, a library, bytecode executable by an interpreter, etc. In this example, identification module 104 may identify the executable file in a variety of ways. For example, identification module 104 may scan a file system for executable files that may be susceptible to heap-spray attacks. Additionally or alternatively, identification module 104 may identify a user-selected executable file. In some examples, identification module 104 may identify the executable file when a user attempts to launch the object-oriented program. In some additional examples, identification module 104 may identify the executable file by receiving a message (e.g., from an anti-virus system) that the executable file is malicious, suspicious, untrusted, and/or unverified.

In another context, the object-oriented program may include a process. As used herein, the term "process" may refer to an instance of a program in execution and/or loaded for execution. In this example, identification module 104 may identify the object-oriented program in a variety of ways. For example, identification module 104 may identify the process when the process is spawned and/or loaded. Additionally or alternatively, identification module 104 may identify the process by identifying a list of current processes.

In an additional context, the object-oriented program may include a source-code file. As used herein, the term "source-code file" may refer to any file that may be used by a compiler to create an executable file. In this example, identification module 104 may identify the object-oriented program in any suitable manner. For example, identification module 104 may operate as part of a compiler and identify the source-code file for compilation.

At step 304 one or more of the systems described herein may identify, within the object-oriented program, a request to allocate memory for a polymorphic object, the polymorphic object including a pointer to a virtual method table that supports dynamic dispatch for at least one method of the polymorphic object. For example, at step 304 identification module 104 may, as part of computing system 202, identify request 212 to allocate memory for polymorphic object 214.

As used herein, the phrase "polymorphic object" may refer to any programmatic object, class-derived entity, and/or data structure with dynamically-bound methods. For example, FIG. 4 is a diagram of an exemplary polymorphic object structure 400. As illustrated in FIG. 4, an object 410 may include object data 412 (e.g., including variables, attributes, properties, and/or metadata for object 410). Object 410 may also include a virtual method table pointer 414 (e.g., a reference to a virtual method table).

As used herein, the term "method" may refer to any method, function, procedure, and/or subroutine executed at a defined address. As used herein, the phrase "virtual method" may refer to any method that may potentially require binding at runtime (e.g., for which an execution address cannot necessarily be assigned during compilation). For example, "virtual method" may refer to a method that both is inheritable by a subtype of a class and may be implemented differently by the subtype. Accordingly, an object-oriented program may select and bind an implementation of a method at runtime. As used herein, the phrase "dynamic dispatch" may refer to any process and/or feature for binding a method at runtime.

As used herein, the phrase "virtual method table" may refer to any table, list, and/or other data structure for storing one or more locations of methods as bound to a polymorphic object. While FIG. 4 depicts object 410 with a pointer to a virtual method table 420, the polymorphic object may include the virtual method table using any suitable alternative structure. For example, the polymorphic object may include a head of a linked list of methods to act as the virtual method table. In this example, the pointer to the virtual method table may include, e.g., the first link in the linked list. As mentioned above, virtual method table point 414 may point to virtual method table 420. Virtual method table may include method pointers 422, 424, 426, and 428, each providing an address for an implementation of the corresponding method. For example, method pointers 422, 424, 426, and 428 may point to methods 432, 434, 436, and 438, respectively.

Returning to step 304 of FIG. 3, identification module 104 may identify the request to allocate memory in a variety of contexts. As mentioned earlier, identification module 104 may identify the object-oriented program in a variety of states, e.g., as a source-code file, as an executable file, and/or as a process. If identification module 104 identifies an executable file, identification module 104 may identify the request to allocate memory by identifying one or more instructions within the executable file that function to allocate memory (e.g., an instruction calling a memory allocation routine, portions of a memory allocation routine, etc.). Likewise, if identification module 104 identifies a process, identification module 104 may identify the request to allocate memory by identifying one or more instructions within the process that function to allocate memory. If identification module 104 identifies a source-code file, identification module 104 may identify the request to allocate memory by identifying a portion of the source code that may cause a memory allocation (e.g., an explicit command to allocate memory, a declaration implicitly backed by a memory allocation, etc.).

Identification module 104 may determine that the request to allocate memory is for a polymorphic object in a variety of ways. For example, identification module 104 may insert a hook into a memory allocation routine of the object-oriented program. As used herein, the term "hook" may refer to any interception of a routine, function call, event, and/or instructions executed as part of such an interception. In some examples, the hook may be configured to determine whether the request to allocate memory is for a polymorphic object or for another purpose. For example, the hook may include instructions for analyzing the request to determine if the request is directed to allocating memory for the polymorphic object. For example, the hook may use heuristics (e.g., based on the size of the allocation request, the structure of the allocation request, the context of the allocation request, etc.) to determine whether the request is directed to allocating memory for the polymorphic object. Additionally or alternatively, identification module 104 may add a message to explicitly identify the request to allocate memory as being directed toward polymorphic objects.

Returning to FIG. 3, at step 306 one or more of the systems described herein may identify an area of memory reserved for polymorphic objects. For example, at step 306 reservation module 106 may, as part of computing system 202, identify reserved area of memory 222.

Reservation module 106 may perform step 306 in any suitable manner. In some examples, reservation module 106 may identify the reserved area of memory by reserving the area of memory. For example, reservation module 106 may allocate the area of memory (e.g., by adding one or more instructions to allocate the area of memory to the object-oriented program) and then return addresses within the area of memory in response to requests to allocate memory for polymorphic objects (e.g., by adding one or more instructions to the object-oriented program). Additionally or alternatively, reservation module 106 may hook and/or modify a memory allocation routine of the object-oriented program to only use a certain range of addresses for requests to allocate memory for polymorphic objects and to use a non-overlapping range of addresses for requests to allocate memory for other data types.

In some examples, the area of memory may include an area of memory separate from a default heap used for memory allocations for non-object data types. For example, FIG. 5 illustrates a system 500 for preventing heap-spray attacks. As illustrated in FIG. 5, system 500 may include a program 510 with an object allocation request 512 and a non-object allocation request 514. Object allocation request 512 may be fulfilled by memory manager 520 (which may include one or more of modules 102 and/or have been modified by one or more of modules 102). Memory manager 520 may fulfill object allocation request 512 from an object heap 530 (e.g., allocating space for an object 536). Likewise, non-object allocation request 514 may be fulfilled by memory manager 520. Memory manager 520 may fulfill non-object allocation request 514 from a general heap 540 (e.g., allocating space for a string 546). As illustrated in FIG. 5, object heap 530 may include only objects (e.g., objects 532, 534, and 536) while general heap 540 may include only non-objects (e.g., strings 542, 544, and 546). As will be described in greater detail below, by allocating memory for objects and non-objects from separate respective heaps, the systems and methods described herein may prevent heap-spray attacks that rely on allocating memory for a non-object (such as a string) in an area of memory where a polymorphic object resides or resided.

In some examples, the reserved area of memory may be reserved exclusively for polymorphic objects. In other examples, the reserved area of memory may be reserved for polymorphic objects and other data types which are unlikely to be used for heap-spray attacks.

Returning to FIG. 3, at step 308 one or more of the systems described herein may allocate memory for the polymorphic object from the reserved area of memory. For example, at step 308 allocation module 108 may, as part of computing system 202, allocate memory for polymorphic object 214 from reserved area of memory 222. Using FIG. 5 as an additional example, at step 308 allocation module 108 may allocate memory for object 536 from object heap 530 (e.g., by modifying memory manager 520 and/or by executing as a part of memory manager 520).

Allocation module 108 may perform step 308 in a variety of ways and in various contexts. For example, if the object-oriented program includes a source-code file, allocation module 108 may operate as a part of a compiler. In this example, allocation module 108 may allocate memory for the polymorphic object from the reserved area of memory by generating one or more instructions for the compiled object-oriented program to allocate memory for the polymorphic object from the reserved area of memory. Additionally or alternatively, if the object-oriented program includes a source-code file, a compiler may generate and/or insert allocation module 108 into the compiled object-oriented program.

In another example, if the object-oriented program includes an executable file, allocation module 108 may modify the executable file and/or operate as a part of a recompiler. In this example, allocation module 108 may allocate memory for the polymorphic object from the reserved area of memory by generating and/or altering one or more instructions within the executable file to allocate memory for the polymorphic object from the reserved area of memory. Additionally or alternatively, if the object-oriented program includes an executable file, a recompiler or other program may insert allocation module 108 into the executable file.

In an additional example, if the object-oriented program includes a process, allocation module 108 may modify the process. Additionally or alternatively, a daemon or other program may insert allocation module 108 into the process.

Figure 6:
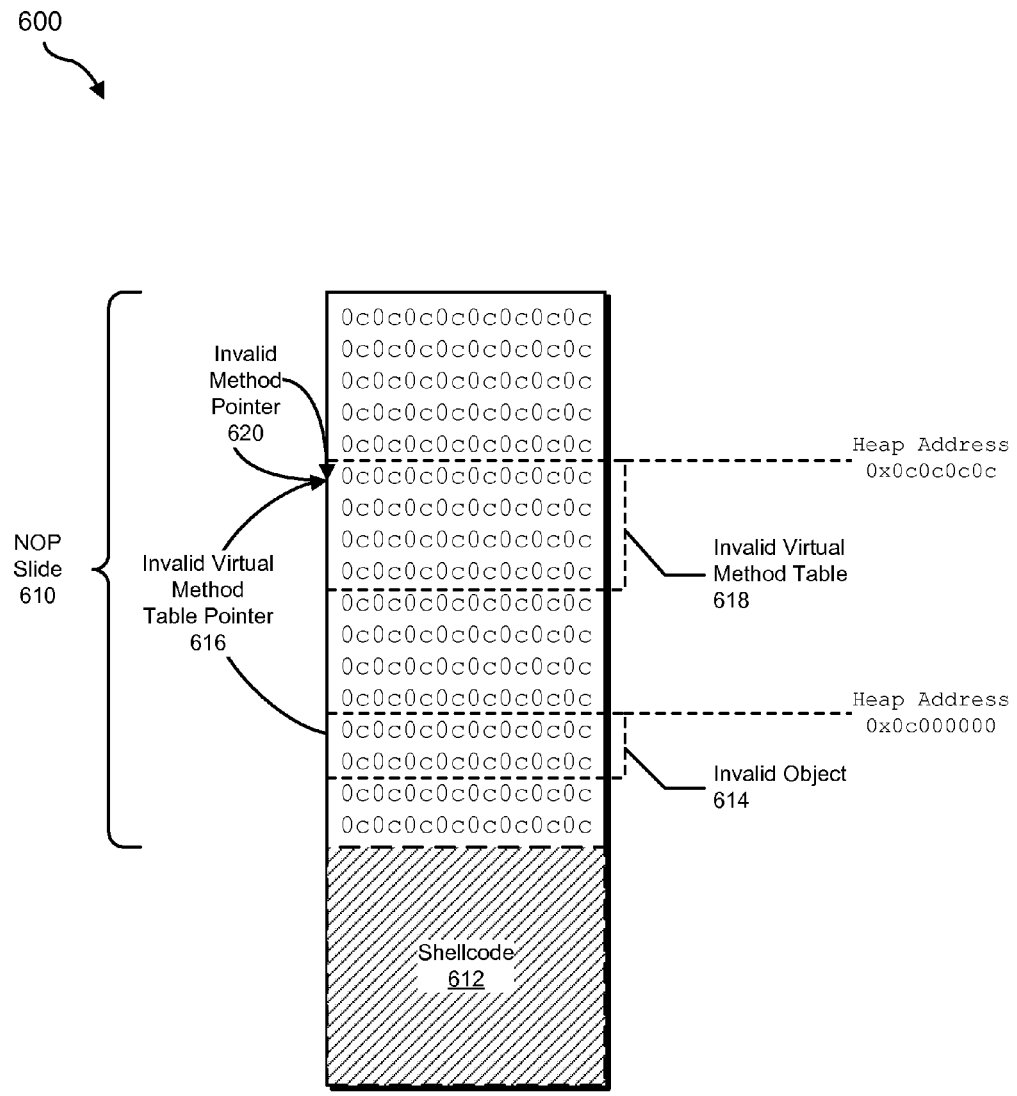
FIG. 6 is a diagram of an exemplary heap-spray attack.

FIG. 6 is a diagram of an exemplary heap-spray attack in a heap 600. As illustrated in FIG. 6, an invalid object 614 may have resided at the address 0x0c000000 within heap 600. However, an attacker may have overwritten a large portion of heap 600 (including invalid object 614) with a NOP slide 610 and a shellcode 612. For example, the attacker may have written NOP slide 610 and shellcode 612 using a buffer overflow exploit (e.g., by finding a controllable buffer in the vicinity of invalid object 614). The contents of NOP slide 610 may function as inconsequential instructions when executed (i.e., NOPs) and may function as a pointer to an address within NOP slide 610 when interpreted as a pointer. For example, invalid object 614 may include an invalid virtual method table pointer 616 which has been overwritten by "0c0c0c0c." Accordingly, invalid virtual method table pointer 616 may now point to heap address 0x0c0c0c0c within NOP slide 610. An invalid method pointer 620 within an invalid method table 618 may also point to heap address 0x0c0c0c0c. Accordingly, when an attempt is made to execute a method of invalid object 614, invalid method pointer 620 will point to an invalid method consisting of NOP slide 610 (with inconsequential instructions consisting of "0c0c0c0c") and malicious shellcode 612. The attacker may thereby execute shellcode 612.

In another example, an attacker may allocate invalid object 614, cause invalid object 614 to be discarded and/or abandoned, and then overwrite the area previously occupied by the object (e.g., with a non-object data type). The attacker may then use an exploit which invokes a method of invalid object 614. As before, this may result in execution proceeding to invalid method pointer 620 and, eventually, shellcode 612.

By maintaining separate areas of memory for objects and non-object data types, the systems and methods described herein may significantly hamper the potential for heap-spray attacks. For example, a buffer overflow may fail to reach and overwrite an object if the object is in a separate area of memory from the buffer. Likewise, a would-be attacker may be prevented from overwriting an area of memory previously occupied by a discarded object with a non-object data type suitable for creating a NOP slide and shellcode. Accordingly, the systems and methods described herein may prevent heap-spray attacks without disabling and/or wasting ranges of memory.

Figure 7:
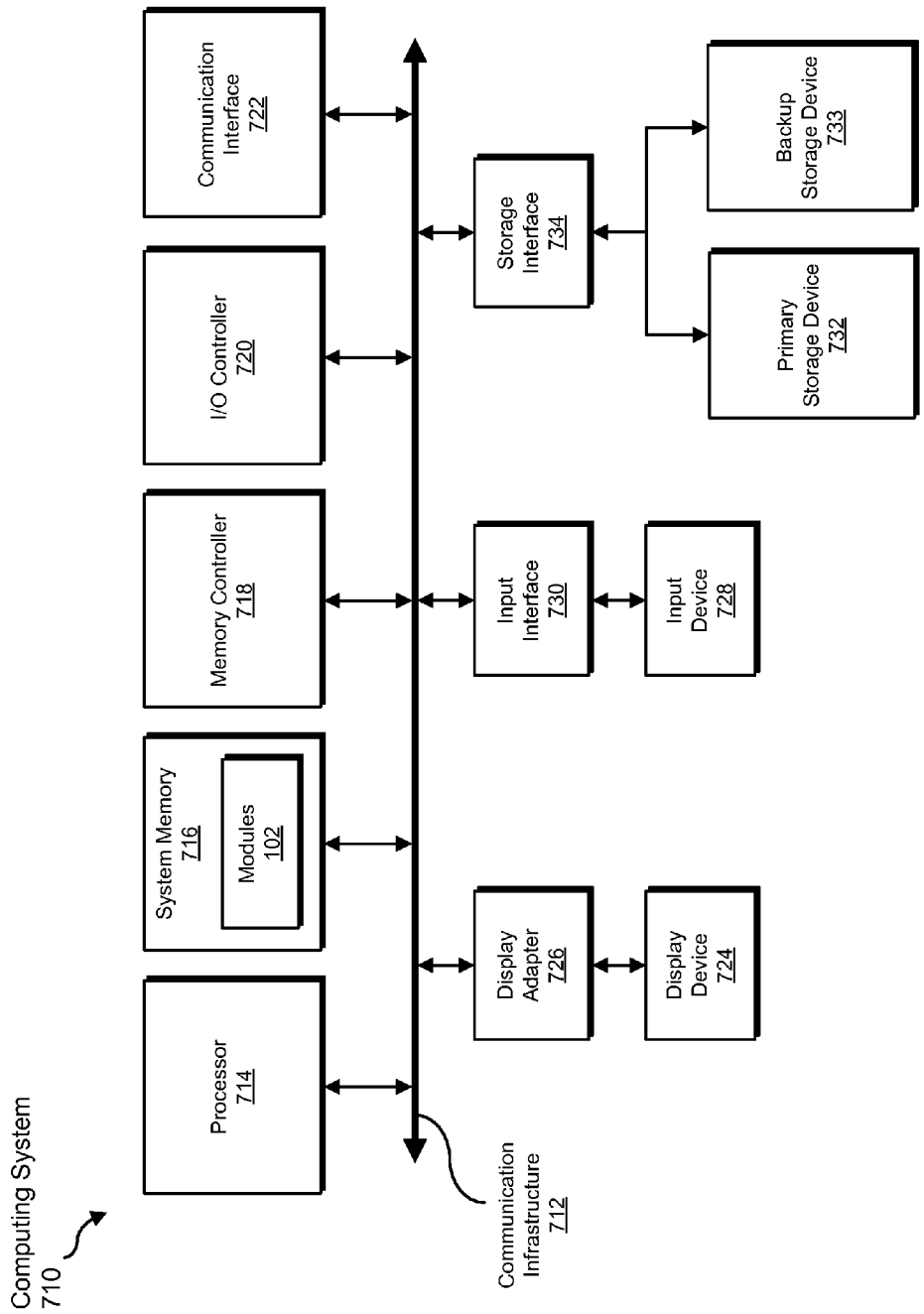
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, inserting, analyzing, reserving, allocating, and/or generating steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, inserting, analyzing, reserving, allocating, and/or generating.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, inserting, analyzing, reserving, allocating, and/or generating steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, inserting, analyzing, reserving, allocating, and/or generating steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, inserting, analyzing, reserving, allocating, and/or generating steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, inserting, analyzing, reserving, allocating, and/or generating steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
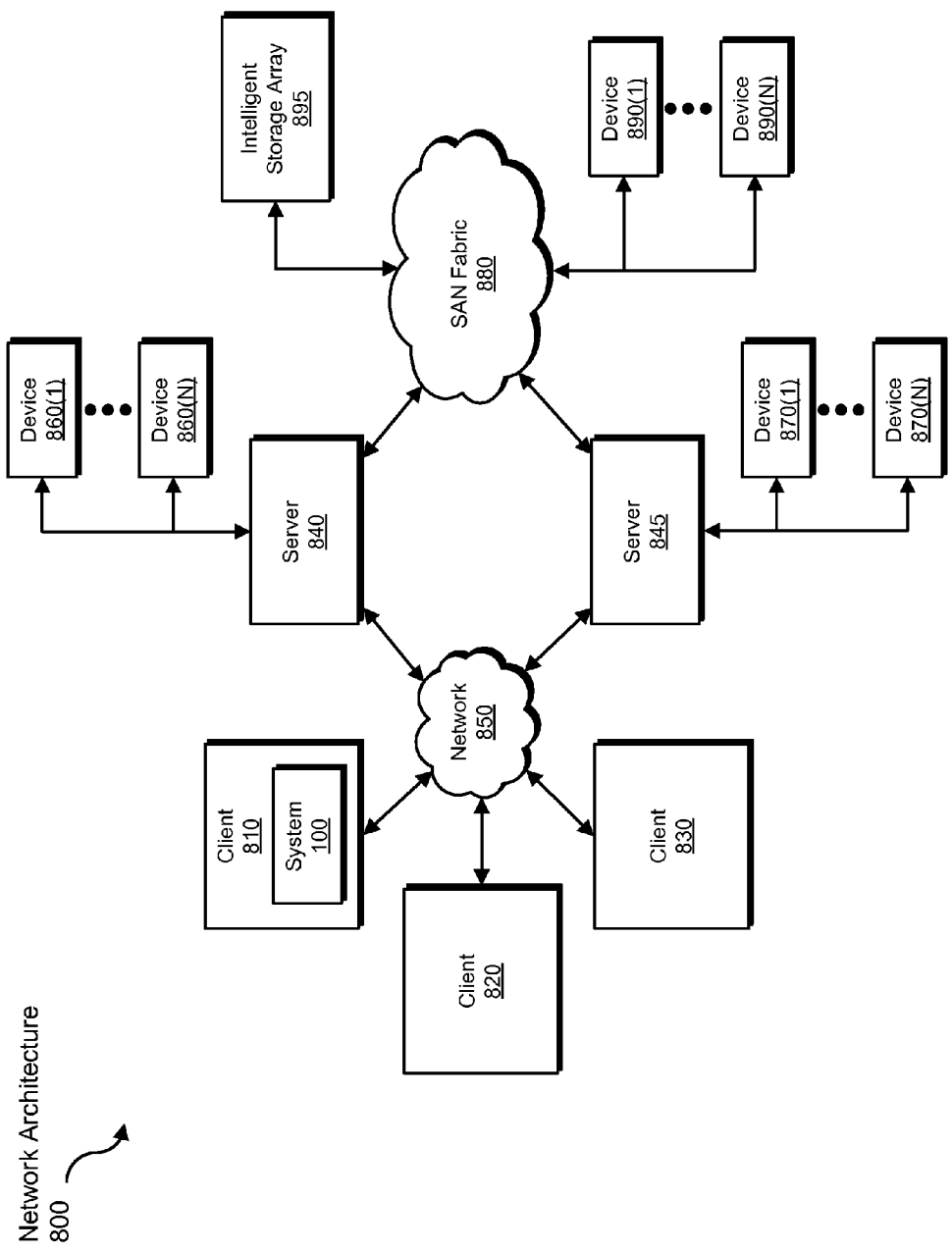
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, inserting, analyzing, reserving, allocating, and/or generating steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for preventing heap-spray attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an object-oriented program into an object-oriented program safe from heap-spray attacks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing heap-spray attacks, at least a portion of the method being performed by a computing device comprising at least one processor, the method comprising:

identifying an object-oriented program;
identifying, within the object-oriented program, a request to allocate memory for a polymorphic object, the polymorphic object comprising a pointer to a virtual method table that supports dynamic dispatch for at least one method of the polymorphic object;
allocating an object heap that is reserved for objects and is separate from a default heap used for non-object data types;
allocating memory for the polymorphic object from the object heap.

2. The computer-implemented method of claim 1, wherein:
the object-oriented program comprises an executable file;
the request comprises an instruction within the executable file.

3. The computer-implemented method of claim 1, wherein:
the object-oriented program comprises a process;
the request comprises an instruction within the process.

4. The computer-implemented method of claim 1, wherein:
the object-oriented program comprises a source-code file;
the request comprises a portion of the source-code file.

5. The computer-implemented method of claim 1, wherein identifying the request comprises inserting a hook into a memory allocation routine of the object-oriented program.

6. The computer-implemented method of claim 1, wherein identifying the request comprises analyzing the request to determine that the request is directed to allocating memory for the polymorphic object.

7. The computer-implemented method of claim 1, wherein allocating the object heap comprises reserving the object heap.

8. The computer-implemented method of claim 1, wherein allocating the object heap comprises identifying a heap reserved exclusively for polymorphic objects.

9. The computer-implemented method of claim 1, wherein allocating the object heap comprises:
using a first range of addresses for the request to allocate memory for the polymorphic object:
using a non-overlapping range of addresses for requests to allocate memory for non-object data types, wherein the non-overlapping range of addresses does not overlap the first range of addresses.

10. The computer-implemented method of claim 1, wherein allocating memory for the polymorphic object comprises generating at least one instruction to allocate memory for the polymorphic object from the object heap.

11. A system for preventing heap-spray attacks, the system comprising:
an identification module programmed to:
identify an object-oriented program;
identify, within the object-oriented program, a request to allocate memory for a polymorphic object, the polymorphic object comprising a pointer to a virtual method table that supports dynamic dispatch for at least one method of the polymorphic object;
a reservation module programmed to allocate an object heap that is reserved for objects and is separate from a default heap used for non-object data types;
an allocation module programmed to allocate memory for the polymorphic object from the object heap;
at least one processor configured to execute the identification module, the reservation module, and the allocation module.

12. The system of claim 11, wherein:
the object-oriented program comprises an executable file;
the request comprises an instruction within the executable file.

13. The system of claim 11, wherein:
the object-oriented program comprises a process;
the request comprises an instruction within the process.

14. The system of claim 11, wherein:
the object-oriented program comprises a source-code file;
the request comprises a portion of the source-code file.

15. The system of claim 11, wherein the identification module is programmed to identify the request by inserting a hook into a memory allocation routine of the object-oriented program.

16. The system of claim 11, wherein the identification module is programmed to identify the request by analyzing the request to determine that the request is directed to allocating memory for the polymorphic object.

17. The system of claim 11, wherein the reservation module is programmed to allocate the object heap by reserving the object heap.

18. The system of claim 11, wherein the reservation module is programmed to allocate the object heap by identifying a heap reserved exclusively for polymorphic objects.

19. The system of claim 11, wherein the reservation module is programmed to allocate the object heap by:

using a first range of addresses for the request to allocate memory for the polymorphic object;
using a non-overlapping range of addresses for requests to allocate memory for non-object data types, wherein the non-overlapping range of addresses does not overlap the first range of addresses.

20. A computer-readable-storage medium comprising one or more computer-executable instructions that, when executed by at least one processor of a computing device, cause the computing device to:
identify an object-oriented program;
identify, within the object-oriented program, a request to allocate memory for a polymorphic object, the polymorphic object comprising a pointer to a virtual method table that supports dynamic dispatch for at least one method of the polymorphic object;
allocate an object heap that is reserved for objects and is separate from a default heap used for non-object data types;
allocate memory for the polymorphic object from the object heap.

* * * * *

UNITED STATES PATENT AND TRADEMARK OFFICE
CERTIFICATE OF CORRECTION

PATENT NO. : 8,788,785 B1
APPLICATION NO. : 13/006705
DATED : July 22, 2014
INVENTOR(S) : Uri Mann Page 1 of 1

It is certified that error appears in the above-identified patent and that said Letters Patent is hereby corrected as shown below:

IN THE CLAIMS:

Claim 9, at column 14, lines 37 to 38, should read:
using a first range of addresses for the request to allocate memory for the polymorphic object;

Signed and Sealed this
Twenty-seventh Day of January, 2015

Michelle K. Lee
*Deputy Director of the United States Patent and Trademark Office*